Figure 1:
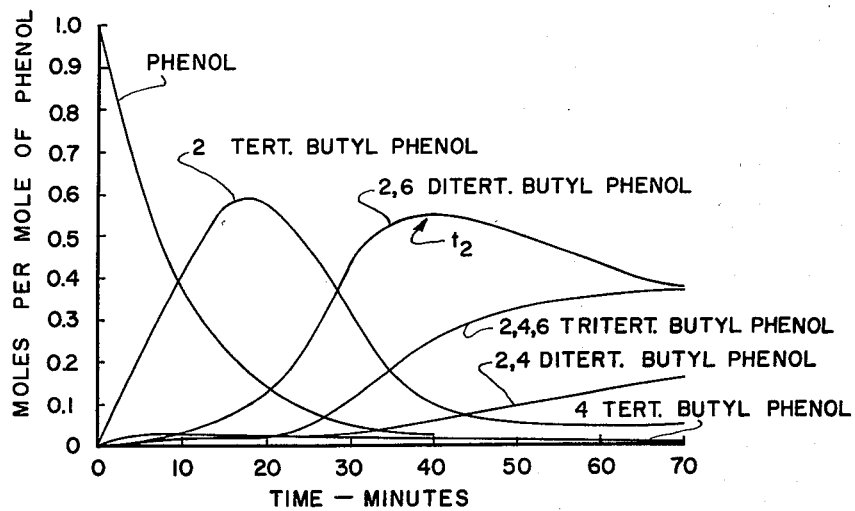

Feb. 2, 1960 V. W. BULS ET AL 2,923,745
ORTHO ALKYLATION OF PHENOLS
Filed Oct. 21, 1957

INVENTORS:
VERNON W. BULS
ROBERT S. MILLER
BY: Alan C. Batchelder
THEIR AGENT

United States Patent Office 2,923,745
Patented Feb. 2, 1960

2,923,745

ORTHO ALKYLATION OF PHENOLS

Vernon W. Buls, Walnut Creek, and Robert S. Miller, Oakland, Calif., assignors to Shell Development Company, New York, N.Y., a corporation of Delaware Application October 21, 1957, Serial No. 691,354

16 Claims. (Cl. 260—624)

This invention relates to the preparation of ortho-alkyl substituted phenols. More particularly, the present invention relates to the use of aluminum halide catalysts in the preparation of ortho-alkyl substituted phenols. This invention relates still more particularly to the preparation of 2,6-ditertiary butyl phenol from phenol and isobutylene in the presence of aluminum chloride catalyst.

The presence of the hydroxyl group upon the benzene ring in such compounds as phenol tends to control the further substitution on the ring in such a way that subsequent constituents of hydroxyl-substituted benzenes add on in the ortho- and para-positions relative to the hydroxyl group. In the case of phenol, the activating influence of the sole hydroxyl group renders the ortho- and para-positions active in different degrees, and in general the para-position is the more active. Para substitution therefore predominates over substitution in the ortho position. For example, upon nitration of phenol, 60% of the substitution occurs in the para-position to yield 4-nitrophenol, and only 40% of the substitution takes place at the ortho position to produce 2-nitrophenol. Even where ortho-substitution does take place, the tendency for the second substituent to add in the para-position to produce the 2,4-di-substituted phenol is far greater than the tendency to add in the para-position to yield the 2,6-di-substituted isomer.

Substituted alkyl phenols have considerable industrial utility because of their antioxidant properties, as well as for the characteristic of flexibility they lend to phenol-formaldehyde resin compositions. They are also useful intermediates in the preparation of detergents. Although alkyl phenols substituted solely in the ortho positions have properties superior to those of para-substituted alkyl phenols in anti-oxidant applications, ortho-substituted alkyl phenols have been produced in uneconomically small quantities by contemporary alkylation processes. Moreover, these processes are complicated by the formation of such extraneous products as isomeric ethers which reduce the yield and render product separation more difficult.

Heretofore, numerous methods and techniques have been described for the preparation of alkylated phenols. The use of aluminum halides, and particularly of aluminum chloride, as an alkylation catalyst, and particularly for catalyzing the addition of olefins to phenols, is old in the art. The product of the aluminum chloride-catalyzed phenol alkylation, however, has heretofore been one wherein the para position relative to the hydroxyl group was the first position to be substituted. The resulting products were therefore invariably p-alkyl phenols, whatever the position of the other alkyl substituents.

It is an important advantage of this invention that it affords high yields of ortho-alkylated phenols which are not substituted in the para position. It is an equally important advantage of the invention that such high yields of ortho-alkylated phenols are produced by the use of plentiful relatively inexpensive aluminum halide catalysts, and with a process wherein the production of para-alkylated phenols is minimized. Thus, by the present invention, it is found that ortho-alkylated phenols are prepared by a novel process wholly unexpected in view of the teaching of the prior art.

The extensive prior art on the alkylation of phenols with olefins in the presence of aluminum halide catalysts would lead a skilled chemist to expect that in such processes the para-alkyl phenols would comprise the predominant part of the alkylated product. We have unexpectedly found, however, that by combining unique conditions of temperature and pressure with aluminum halide catalysts, and by employing heretofore unattempted proportions of reactants, a reaction is produced wherein large proportions of di-ortho substituted alkyl phenols are produced together with comparatively small amounts of para-substituted phenols. Moreover, we have discovered conditions whereby the desired ortho-substituted products may be recovered while they are most plentifully present in the reaction mixture and before competing reactions produce compounds of less utility from them.

The present invention has as an object the provision of a direct, commercially applicable process for the preparation of ortho-alkyl phenols in high yield by the alkylation of phenols with olefins. It is an object of the invention to provide a process which produces ortho-alkyl phenols by the use of relatively inexpensive readily-available aluminum halide catalysts under moderate conditions of heat and pressure, and in comparatively short reaction times. It is a further object of this invention to provide an economical process for the preparation of 2,6-di-tertiary butyl phenol from phenol and isobutylene in the presence of aluminum chloride catalyst. Further objects and advantages of the invention will be apparent from the following description of the new process.

Figure 2:
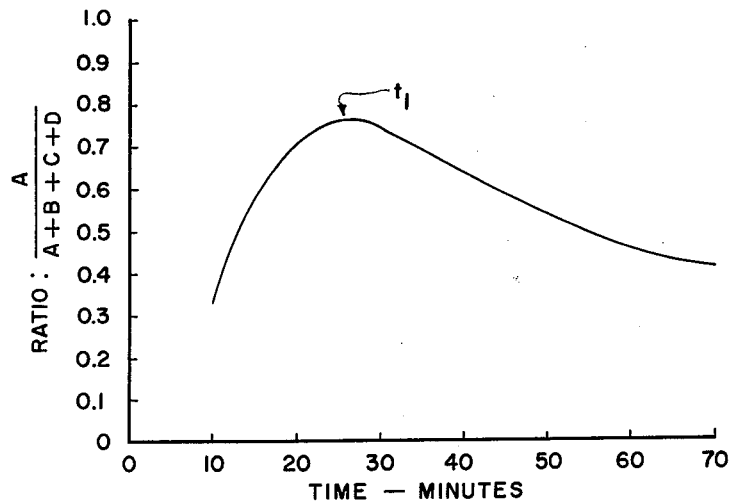

Forming a part of the present specification is the drawing, wherein there are illustrated in Figures 1 and 2 certain of the results that serve to characterize the invention.

Broadly stated, the process to which the present invention relates comprises heating together under pressure a mixture of an olefin and phenol containing an excess of the olefin while they are in intimate contact with an aluminum halide catalyst, and separating from the mixture the desired 2,6-dialkyl phenol at a time between the time at which the ratio of the mole concentrations of $$\frac{\text{2,6-dialkyl phenol}}{\text{2,6-dialkyl phenol} + \text{2,4-dialkyl phenol} + \text{2,4,6-trialkyl phenol} + \text{4-alkyl phenol}}$$

reaches a maximum, and the time at which the concentration of 2,6-dialkyl phenol in the reaction mixture reaches a maximum. In this manner, the dialkyl phenol product is separated from the reactants and products at a time when it is present in maximum quantity and before it engages in competing reactions to produce the undesirable 2,4,6-trialkyl phenol. In addition to the catalyst, small amounts of such promoters as olefin halides are useful to increase the reaction rate slightly.

We have found, in general, that any of the aluminum halide catalysts will be operative with the reactants of this invention to produce ortho-dialkyl phenols. Aluminum chloride is the most preferable because of its high relative activity, availability and low cost, but aluminum bromide is also suitable, as are aluminum iodide and fluoride.

The catalyst should preferably be employed in comparatively small quantities to prevent the reaction from proceeding at so great a rate that it becomes uncontrollable. While the amount of catalyst employed for optimal results will depend on the natures of the catalyst and reactants, as well as on the reaction conditions, we have discovered that amounts on the order of 0.001 to 0.20 mole of aluminum halide catalyst per mole of phenol will give best results. In using the preferred catalyst, aluminum chloride, the preferred concentration range is 0.005 to 0.10 mole of aluminum chloride per mole of phenol.

In addition to the catalyst we have found the use of catalyst promoters helpful. For the purposes of this invention, promoters may consist of halogenated organic compounds, prepared, for example, from the olefin which is used as the alkylating agent, and whose halide component is that of the aluminum halide catalyst. Thus, we have observed that the use of tert. butyl chloride in quantities of ten moles per hundred moles of aluminum chloride increases the reaction rate in the aluminum chloride-catalyzed alkylation of phenol with isobutylene. Quantities of the promoter from 0.01 to 1.0 mole per mole of catalyst have been found to give desirable results, while concentrations of 0.05 to 0.2 mole per mole of catalyst are preferred. Other reagents suitable for use as promoters in our process include such hydrogen halides as anhydrous hydrogen chloride, and other organic halides, e.g., amyl chloride.

The function of the promoter is, of course, to increase the reaction rate of the aluminum halide-catalyzed reaction without the necessity of increasing the catalyst concentration. Thus, the addition to the process of comparatively small amounts of promoter gives rate increases equivalent to that obtained by adding larger amounts of aluminum halide catalyst.

The reactants which are to be employed in the present invention comprise monoolefins, and hydroxy benzene compounds having a replaceable hydrogen atom on the carbon atoms in the 2, 4 and 6 positions relative to the hydroxyl group. The olefins are preferably those which contain from four to seven carbonatoms in the molecule and may contain one tertiary carbon atom, e.g., isobutylene and isoamylene. One particularly useful class of olefins which we have also found to give valuable products when reacted with phenols by our process is that class comprising aryl olefinic compounds. Thus, our process may be employed with phenol and alpha methyl styrene to yield 2,6-α-cumyl phenol, an extremely useful antioxidant of low volatility.

Although in the preferred embodiment of our invention we employ olefins having tertiary carbon atoms, we do not intend that our invention should be limited thereto, since we have found it to be operative with straight-chain olefins as well. Thus, such olefinic hydrocarbons as straight-chain butenes, propenes, and hexenes may readily be added to phenols with our new process.

While the process is preferably employed for the alkylation of phenol itself, other hydroxy benzene compounds may also be used. Examples of these are such meta-substituted phenols as m-cresol, m-ethyl phenol, 3,5-dimethyl phenol, m-aminophenol, m-nitrophenol and m-bromophenol. Naturally, the unique ortho-directing effect of the aluminum halide catalysts is primarily required for alkylating phenols wherein the carbon atom para to the hydroxyl group is unsubstituted. Moreover, because of this unique ortho-directing result, our process may also be employed for adding a second o-alkyl substituent to compounds already monoortho-alkylated. For example, ortho-cresol may, by means of our process, be readily converted to 2-methyl-6-tert. butyl phenol.

The unique and unpredicted results of our alkylation process, we have discovered, are due in part to the fact that we employ a reactant ratio of greater than one mole of olefin per mole of phenol. We have found that the di-ortho alkylation takes place only when there is present an excess of the olefin reactant. However, mole ratios in excess of six moles of olefin per mole of phenol are undesirable because the reaction rate of the alkylation process is materially reduced in the presence of olefin in excess of this ratio. As a consequence, mole ratios of approximately 2-5 moles of olefin per mole of phenol give best results. For example, in the case where phenol is alkylated with isobutylene in the presence of aluminum chloride catalyst, we have obtained optimal results when the isobutylene to phenol ratio is approximately four moles to one.

In general, the phenol akylations of the prior art have been conducted under rather moderate conditions of temperature and pressure. Prior descriptions of alkylation of phenol with olefines rarely include temperatures in excess of 100° C. or pressures much in excess of atmospheric. We have found, however, that by altering the reaction environment to include temperatures above 100° C. and pressures of greater than 100 gauge pounds per square inch, we produce not the predominantly para-alkylated phenols of the art but, instead and in high yield, alkylated phenols having ortho but no para substituents.

Thus, operative temperatures for conduction the alkylation process of our invention lie between about 100° C. and 200° C., while preferred temperatures lie between 120° C. and 180° C. At higher temperatures the yield of the 2,6-dialkyl phenol decreases, while at lower temperatures the reaction slows down to uneconomic rates although satisfactory yields of the dialkyl phenols are obtained. For such reactions as the aluminum chloride-catalyzed alkylation of phenol with isobutylene, we have found that temperatures from 150° C. to 160° C. give excellent yields of 2,6-ditertiary butyl phenol. We have also achieved excellent results by conducting our ortho-alkylation process at temperatures as low as 120° C. with the aid of the promoters mentioned above.

At these temperatures, we find that the pressure at which the reaction may be conducted may be varied over a wide range without detracting from the yield of ortho-alkylated products. Pressures of 100 to 1000 gauge pounds per square inch we have found to be operable, and pressures on the order of 200–900 p.s.i.g. at temperatures of around 155° C. give excellent results. Since the phenol reactant and the alkylated products are liquids at the temperature of the reaction, there is no need for a solvent in which to conduct the reaction, but for purposes of temperature control inert solvents or diluents may be employed. These are preferably such non-reactive high-boiling liquids as the long chain paraffins, e.g., n-nonane, n-decane, n-undecane, n-hexadecane, and the like. It is also desirable to conduct the reaction in the absence of air, and such non-reactive inert gases as nitrogen or helium may be used to blanket the reaction.

The reaction may be conducted in a batchwise manner, by adding one reactant and the catalyst to a reactor and heating them while passing in the other reactant under conditions wherein maximum mixing of the catalyst and reactants are achieved. Since the alkylating agents of this invention are low molecular weight olefins, they are gases or liquids at the reaction temperatures, and they can conveniently be added to the heated phenol-catalyst mixture as fast as they can be absorbed while at the same time maintaining the proper excess of olefin. Care should be taken not to continue the addition of the olefins and heating past the times at which the 2,6-dialkyl product should be withdrawn from the reaction mixture, since continued reaction will lead both to the production of the undesired 2,4,6-trialkyl phenol as well as the polymerization of the olefin.

Alternatively, the alkylation of the phenol may be conducted in a continuous manner, by passing streams containing the aluminum halide catalyst and the phenol and olefin reactants through a zone wherein they are subjected to the necessary conditions of heat, pressure and mixing for a time sufficient to yield the desired 2,6-dialkyl phenol product. In the continuous process, any unreacted phenol, olefin and the intermediate 2-alkyl phenol can, of course, be recovered and recycled to the beginning of the reaction zone to be used again.

It is desirable to stop the action of the catalyst at the end of the reaction to prevent isomerization, dealkylation, or production of undesirable by-products and polymers. This can be easily achieved by adding caustic or water to the reactants. The phenol may then be readily distilled or extracted from the resulting mixture.

Control of the reaction time, we have found, is an important feature of the present invention. We have discovered that several reactions are taking place simultaneously but at different rates during the alkylation. These reactions will be discussed with reference to the preferred embodiment of the invention, the alkylation of phenol with isobutylene in the presence of an aluminum chloride catalyst to produce 2,6-ditertiary butyl phenol. In that process, the reactions are

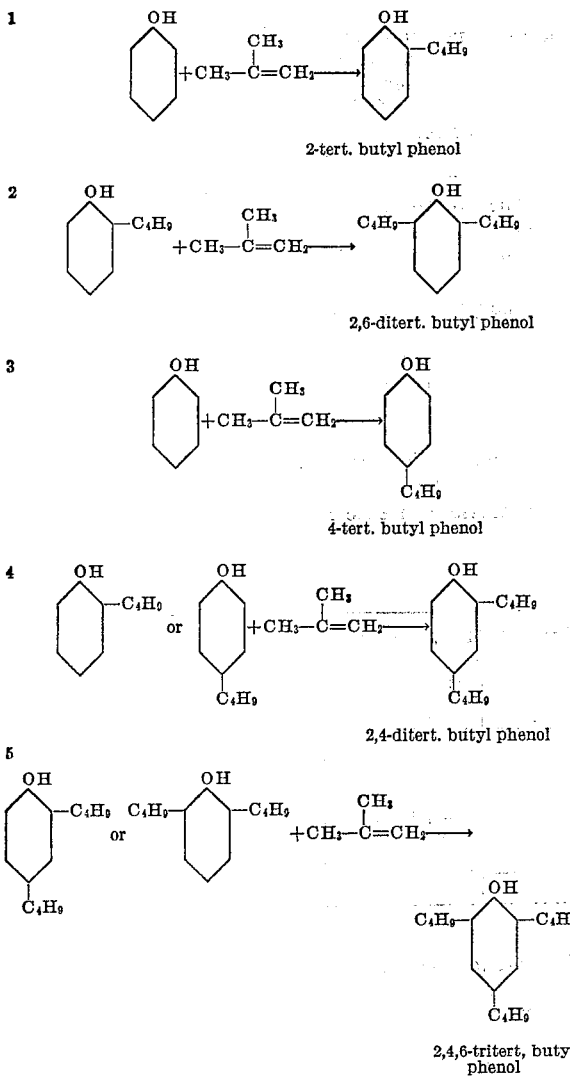

Of these Reactions 1 and 2 produce, respectively, an intermediate of the final desired product and the product itself, while Reactions 3, 4 and 5 produce undesirable by-products. For maximum production of the desired 2,6-ditert. butyl phenol, we find that the product must be separated from the reaction mixture during some period at which it is being produced in maximum yield by Reactions 1 and 2, but before the supply of the basic phenol has been depleted by production of the p-tert. butyl phenol by Reaction 3 and the supply of the intermediate 2-tert. butyl phenol has been reduced by Reaction 4, and before the 2,6-ditert. butyl phenol itself is converted into the 2,4,6-tritert. butyl product by Reaction 5.

The period during which this recovery must take place we delineate by two times $t_1$ and $t_2$. At time $t_1$, the molar concentration of the desired 2,6- product is at a maximum relative to the concentration in the reaction mixture of the undesired products of Reactions 3, 4 and 5. At this time, the absolute concentration of the 2,6-product is increasing, but the rate of production of the undesirable product is also increasing in such a manner that the by-product reactions are producing competitive products in significant quantities. The concentration of these products after $t_1$ is thus increasing faster than the concentration of the 2,6-ditert. butyl product. The time $t_1$ can be analytically determined by measuring the time at which the ratio of the molar concentrations $$\frac{\text{2,6-ditert. butyl phenol}}{\text{2,6-ditert. butyl phenol + 4-tert. butyl phenol + 2,4-ditert. butyl phenol + 2,4,6-tritert. butyl phenol}}$$

reaches a maximum.

At the time $t_1$ the absolute concentration of the desired 2,6-tritert. butyl phenol is continuing to increase in the reaction mixture. However, at some subsequent time $t_2$ we have observed that the effect of Reaction 5 as well as that of Reactions 3 and 4 is to stop the increase in its concentration and begin to convert it to the 2,4,6-tritert. butyl phenol, thus decreasing its absolute concentration. At this time $t_2$ the concentration of the product is at a maximum, and after $t_2$ it is being lost to a competing product. Although considerable quantities of the 2,6-ditert. butyl phenol remain in the reaction mixture after the time $t_2$, the increasing concentration of the undesirable by-products after that time coupled with the decline in the absolute concentration of the 2,6 product render its recovery less economically attractive.

As a consequence, the times for recovering the desired 2,6-dialkyl phenol in maximum yield we have limited by the times $t_1$ and $t_2$ and for the purposes of this invention should be between those times. Naturally, the absolute times after the start of a batch reaction for the conditions represented by $t_1$ and $t_2$ to occur will depend on all of the reaction variables, e.g., the nature and amount of aluminum halide catalyst, the nature and relative concentrations of the olefin and phenol reactants, the temperature and pressure at which the alkylation is conducted, etc.

The reaction products may be separated by such well-known industrial methods as fractional distillation. The phenol, and mono-alkyl phenol products may conveniently be removed prior to the distillation by extraction from the reaction mixture with caustic, which also stops the catalyst action, and the remaining products can easily be distilled from one another. Since other reactions, such as the isomerization of the mono- and dialkyl products, will take place in the reaction mixture in the presence of the aluminum catalyst even after the pressure and temperature of the mixture have been reduced, it is worthwhile to conduct these separations as soon after $t_2$ as possible.

The following example illustrates the process of the invention in some of its advantageous embodiments.

EXAMPLE

A series of alkylation runs were conducted in a batchwise manner, employing a heated reactor vessel capable of being agitated while under pressure. The reactor was charged at the beginning of each run with phenol and aluminum chloride catalyst, and then sealed and pressurized very rapidly with isobutylene. During the course of each run, the vessel was heated and agitated, and samples of the reaction mixture were taken at frequent intervals. The samples so secured were analyzed by gas chromatography to determine the nature and quantity of each component therein. The pressure of the isobutylene gas at the beginning and at the end of each run were recorded, and the results of the runs are shown in the following tabulation, Table I.

Table I

| Run | Ratio, Moles $C_4H_9$/Moles OH | Moles $AlCl_3$ Per Mole OH | Promoter, Moles, tert. Butyl Chloride/mol OH | Temp., °C. | Pressure, p.s.i.g., Initial-Final | Minutes After 0 $t_1$ | Minutes After 0 $t_2$ | Yield, 2,6-Ditert. Butyl Phenol, Moles/Mole Phenol at $t_2$ |
|---|---|---|---|---|---|---|---|---|
| 1 | 4 | 0.01 | | 158-154 | 520-215 | 120 | 140 | 0.6 |
| 2 | 3 | 0.02 | | 160-155 | 465-125 | 12 | 18 | 0.54 |
| 3 | 4 | 0.02 | | 161-154 | 630-260 | 25 | 40 | 0.56 |
| 4 | 4 | 0.02 | 0.002 | 159-155 | 530-205 | 22 | 33 | 0.56 |
| 5 | 4 | 0.02 | 0.02 | 155 | ¹815-400 | 24 | 27 | 0.48 |
| 6 | 4 | 0.02 | 0.02 | 155 | 490-135 | 24 | 32 | 0.53 |
| 7 | 3 | 0.02 | 0.002 | 120 | 300-100 | 128 | 170 | 0.60 |

¹ Includes nitrogen.

The concentrations, in moles per mole of phenol, of the reactant phenol and the several alkylated products, measured at various times during the alkylation, are shown for a typical run, run 3 in Table I, in Table II. Also noted in Table II are the values of the ratio of molar concentrations $$\frac{\text{2,6-ditert. butyl phenol}}{\text{2,6-ditert. butyl phenol} + \text{4 tert. butyl phenol} + \text{2,4-ditert. butyl phenol} + \text{2,4,6-tritert. butyl phenol}}$$

at several of these times. The data in Table II is also plotted in part in Figure 1, which shows the concentrations of phenol and the reaction products as a function of time; and in part in Figure 2, which shows the values for the ratio as a function of time. The desired reaction product 2,6-ditert. butyl phenol, and the undesired by-products 4-tert. butyl phenol, 2,4-ditert. butyl phenol and 2,4,6-tritert. butyl phenol are represented in the ratio in Figure 2 by the letters A, B, C, and D respectively, and are also noted as such in Table II. These figures also indicate the occurrence of the maxima at times $t_1$ and $t_2$.

reaches a maximum, and the time at which the concentration of 2,6-dialkyl phenol in the reaction mixture reaches a maximum.

2. The process of claim 1, wherein the catalyst is aluminum chloride.

3. The process of claim 1, wherein the catalyst is aluminum bromide.

4. The process of claim 1, wherein the olefin is isoamylene.

5. The process of claim 1, wherein the pressure is between 100 and 1000 gauge pounds per square inch.

6. The process of claim 1 wherein the phenol is orthocresol.

7. A process for the preparation of 2,6-ditertiary butyl phenol, which comprises mixing isobutylene, phenol and an aluminum halide catalyst in a ratio of at least about two moles of isobutylene and from 0.001 to 0.20 mole of aluminum halide per mole of phenol, heating the resulting mixture at a temperature of at least about 100° C. and a pressure in excess of 100 p.s.i.g., and separating

Table II

| Compound | Time After Start of Run, Minutes | | | | | | | | | | | |
|---|---|---|---|---|---|---|---|---|---|---|---|---|
| | 0 | 2 | 4 | 6 | 8 | 10 | 14 | 22 | 30 | 40 | 70 | 437 |
| Phenol | 1.00 | 0.85 | 0.70 | 0.60 | 0.43 | 0.35 | 0.24 | 0.18 | 0.05 | 0.03 | | |
| 2 Tert. Butyl Phenol | 0 | 0.06 | 0.16 | 0.25 | 0.39 | 0.40 | 0.61 | 0.54 | 0.32 | 0.10 | 0.05 | 0.02 |
| 4 Tert. Butyl Phenol (B) | 0 | 0.01 | 0.02 | 0.02 | 0.03 | 0.02 | | 0.02 | 0.01 | | 0.03 | 0.01 |
| 2,4-Ditert. Butyl Phenol (C) | 0 | 0.01 | 0.01 | 0.03 | 0.03 | 0.03 | 0.05 | 0.03 | 0.03 | 0.06 | 0.16 | 0.25 |
| 2,6-Ditert. Butyl Phenol (A) | 0 | | 0.004 | 0.01 | 0.005 | 0.05 | 0.03 | 0.19 | 0.45 | 0.55 | 0.38 | 0.04 |
| 2,4,6-Tritert. Butyl Phenol (D) | 0 | 0.01 | 0.01 | 0.01 | 0.03 | 0.06 | 0.03 | 0.02 | 0.11 | 0.26 | 0.37 | 0.66 |
| Ratio: $\frac{A}{A+B+C+D}$ | | | | | 0.05 | 0.33 | 0.27 | 0.74 | 0.74 | 0.64 | 0.41 | 0.04 |

We claim as our invention:

1. A process for the preparation of 2,6-dialkyl phenols, which comprises mixing an olefin and a phenol having a replaceable hydrogen atom on the carbon atom para to the hydroxyl group, a replaceable hydrogen atom on one of the carbon atoms ortho to the hydroxyl group, and on the other carbon atom ortho to the hydroxyl group a radical selected from the group consisting of a replaceable hydrogen atom and alkyl groups having up to four carbon atoms, and an aluminum halide catalyst, in a ratio of at least about two moles of olefin and from about 0.001 to 0.20 mole of aluminum halide per mole of the phenol, heating the resulting mixture at a temperature of at least about 100° C. and a pressure in excess of 100 p.s.i.g., and separating the 2,6-dialkyl phenol from the mixture at some time between the time at which the ratio of the molar concentrations $$\frac{\text{2,6-dialkyl phenol}}{\text{2,6-dialkyl phenol} + \text{4 alkyl phenol} + \text{2,4-dialkyl phenol} + \text{2,4,6-trialkyl phenol}}$$

the 2,6-ditertiary butyl phenol from the mixture at some time between the time at which the ratio of the molar concentrations $$\frac{\text{2,6-ditert. butyl phenol}}{\text{2,6-ditert. butyl phenol} + \text{2,4-ditert. butyl phenol} + \text{2,4,6-tritert. butyl phenol} + \text{4 tert. butyl phenol}}$$

reaches a maximum, and the time at which the concentration of 2,6-ditert. butyl phenol in the reaction mixture reaches a maximum.

8. The process of claim 7, wherein the catalyst is aluminum chloride.

9. The process of claim 7, wherein the catalyst is aluminum bromide.

10. A process for the preparation of 2,6-ditertiary butyl phenol, which comprises heating together under a pressure of between 200 and 900 gauge p.s.i. a mixture of phenol and isobutylene having a mole ratio of isobutylene to phenol of between 5:1 and 2:1, in intimate contact with an aluminum chloride catalyst having a concentration of between 0.005 to 0.20 mole of aluminum chloride per mole of phenol, at a temperature between about 120° C. and 180° C. and separating the 2,6-ditertiary butyl phenol from the mixture at some time between the time at which the ratio of the molar concentrations $$\frac{\text{2,6-ditert. butyl phenol}}{\text{2,6-ditert. butyl phenol}+\text{2,4-ditert. butyl phenol}+\text{2,4,6-tritert. butyl phenol}+\text{4-tert. butyl phenol}}$$

reaches a maximum, and the time at which the concentration of 2,6-ditert. butyl phenol reaches a maximum.

11. The process of claim 10, where in addition to the catalyst, the mixture comprises 0.01 to 1.0 mole of promoter per mole of catalyst, the promoter being a halide selected from the group consisting of hydrogen halides and saturated organic halides.

12. The process of claim 10, where in addition to the catalyst, the mixture comprises 0.01 to 1.0 mole of tert. butyl chloride per mole of catalyst.

13. The process of claim 10, where in addition to the catalyst, the mixture comprises 0.01 to 1.0 mole of hydrogen chloride per mole of catalyst.

14. A process for the preparation of 2,6-di-tertiary butyl phenol which comprises mixing phenol, isobutylene and aluminum chloride catalyst in a mole ratio of at least about two moles of isobutylene and from about 0.001 to 0.20 mole of aluminum chloride per mole of phenol, heating the resulting mixture at a temperature between about 120° C. and 180° C. under a pressure between 200 and 900 p.s.i.g., and separating the 2,6-ditertiary butyl phenol from the mixture at some time between the time at which the ratio of the molar concentrations $$\frac{\text{2,6-ditert. butyl phenol}}{\text{2,6-ditert. butyl phenol}+\text{2,4-ditert. butyl phenol}+\text{2,4,6-tritert. butyl phenol}+\text{4-tert. butyl phenol}}$$

reaches a maximum, and the time at which the concentration of 2,6-detertiary butyl phenol reaches a maximum.

15. A process for the preparation of 2,6-ditertiary butyl phenol which comprises mixing phenol, isobutylene and aluminum chloride in a ratio of between 2 and 5 moles of isobutylene and about 0.001 to 0.20 mole of aluminum chloride per mole of phenol, heating the resulting mixture at a temperature between about 120° C. and 180° C. under a pressure between 200 and 900 p.s.i.g., and separating the 2,6-ditertiary butyl phenol from the mixture at some time between the time at which the ratio of the molar concentrations $$\frac{\text{2,6-ditert. butyl phenol}}{\text{2,6-ditert. butyl phenol}+\text{2,4-ditert. butyl phenol}+\text{2,4,6-tritert. butyl phenol}+\text{4-tert. butyl phenol}}$$

reaches a maximum, and the time at which the concentration of 2,6-ditertiary butyl phenol reaches a maximum.

16. A process for the preparation of 2-methyl-6-tertiary-butyl phenol, which comprises mixing ortho-cresol, isobutylene and aluminum chloride in a mixture of at least one mole of isobutylene and from about 0.001 to 0.20 mole of aluminum chloride per mole of ortho-cresol, heating the resulting mixture at a temperature between about 120° C. and 180° C. under a pressure in excess of 100 p.s.i.g., and separated the 2-methyl-6-tertiary-butyl phenol from the mixture at some time between the time at which the ratio of the molar concentrations $$\frac{\text{2-methyl-6-tert. butyl phenol}}{\text{2-methyl-6-tert. butyl phenol}+\text{2-methyl-4-tert. butyl phenol}+\text{2-methyl-4,6-ditert. butyl phenol}}$$

reaches a maximum, and the time at which the concentration of 2-methyl-6-tert. butyl phenol reaches a maximum.

References Cited in the file of this patent

UNITED STATES PATENTS

| | | |
|---|---|---|
| 2,523,939 | Braidwood | Sept. 26, 1950 |
| 2,560,666 | Stevens et al. | July 17, 1951 |
| 2,655,547 | Bryner et al. | Oct. 13, 1953 |

FOREIGN PATENTS

| | | |
|---|---|---|
| 701,264 | Great Britain | Dec. 23, 1953 |